United States Patent [19]

Wang

[11] Patent Number: 5,304,787
[45] Date of Patent: Apr. 19, 1994

[54] LOCATING 2-D BAR CODES

[75] Inventor: Ynjiun P. Wang, Stony Brook, N.Y.

[73] Assignee: Metamedia Corporation, Port Jefferson, N.Y.

[21] Appl. No.: 69,546

[22] Filed: Jun. 1, 1993

[51] Int. Cl.$^5$ ............................................. G06K 7/10
[52] U.S. Cl. .................................. 235/462; 235/470; 235/463; 235/494
[58] Field of Search ............... 235/462, 467, 472, 470, 235/494, 440, 463

[56] References Cited

U.S. PATENT DOCUMENTS

| | | | |
|---|---|---|---|
| 4,728,784 | 3/1988 | Stewart | 235/472 |
| 4,948,955 | 8/1990 | Lee et al. | 235/462 |
| 4,988,852 | 1/1991 | Krishnan | 235/472 |
| 5,138,140 | 8/1992 | Siemiatkowski et al. | 235/462 |

FOREIGN PATENT DOCUMENTS 0384955  9/1990  European Pat. Off. ............ 235/462

*Primary Examiner*—Donald Hajec
*Assistant Examiner*—Esther Chin
*Attorney, Agent, or Firm*—Kenneth P. Robinson

[57] ABSTRACT

After a two-dimensional bar code is scanned to provide a stored image, the location (i.e., bounds, including orientation) of the bar code image within the scanned area image must be determined to enable decoding. Methods for locating the bar code image include the steps of sampling the stored image, identifying sampling traversals of bar code start and stop patterns, and correlating the identified start and stop pattern traversals to a common bar code image. The correlating data is then used to identify a nominally rectangular area bounding the bar code image. A bounding box may be identified as the smallest area capable of encompassing all of the start and stop pattern traversals related to a common bar code image. Output location data may specify the coordinates of the four corners of a bounding box for use in subsequent decoding. Related systems are described.

11 Claims, 1 Drawing Sheet

U.S. Patent  Apr. 19, 1994  5,304,787
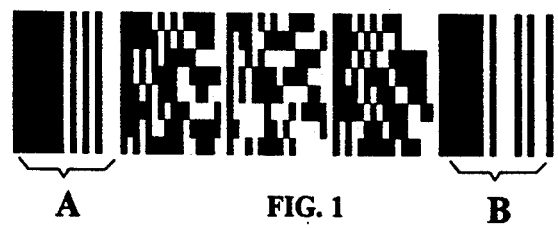
A    FIG. 1    B
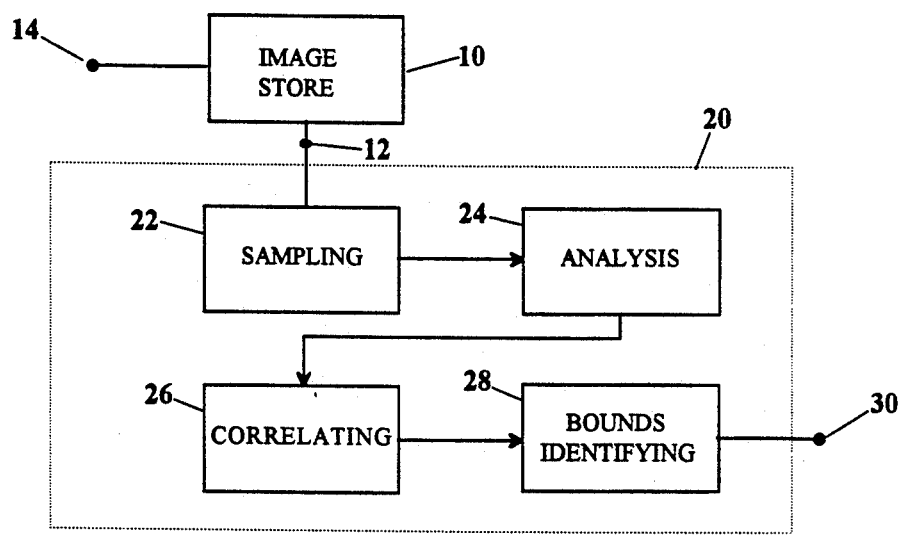
FIG. 2
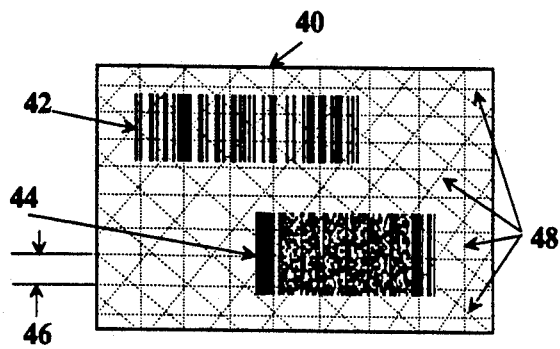
FIG. 3a
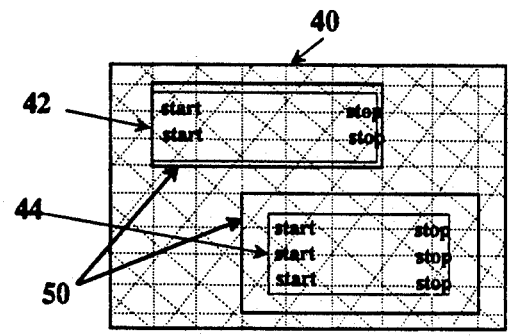
FIG. 3b

LOCATING 2-D BAR CODES

This invention relates to locating and determining the bounds and orientation of two-dimensional bar code images, particularly during the process of scanning and decoding of such bar code images.

BACKGROUND OF THE INVENTION

The application and use of the essentially ubiquitous one-dimensional bar code are well established. Such bar code symbols are provided as images having two physical dimensions, however the bar code includes information coded in only one dimension (e.g., left to right). While such one-dimensional bar codes have found innumerable applications, their usefulness is ultimately limited by amount of information which can be encoded in each such bar code.

Two-dimensional bar codes, enabling encoding of greatly increased quantities of information, have now been proposed. FIG. 1 shows an example of a two-dimensional bar code. Such bar codes typically include a few to many rows of coded data grouped in parallel alignment between start and stop patterns which bound the group of rows of coded data transversely to the rows. Coded row data, also typically included in the bar code, may provide information identifying and distinguishing individual rows of data, information regarding the data coded in such a row, information enabling error correction, etc. While such two-dimensional bar code images also have two dimensions, they differ from one-dimensional bar codes in providing two-dimensions of coded information. An example of a two-dimensional bar code is given in the present inventor's prior U.S. Pat. No. 5,113,455, entitled "System For Encoding Data in Machine Readable Graphic Form", issued May 12, 1992. Another example, described as the "PDF417" symbol, has been proposed in a PDF417 Specification, dated October 18, prepared by the present inventor for Symbol Technologies, Inc. and submitted for review by the Technical Symbology Committee of the Automatic Identification Manufacturers, Inc.

One-dimensional bar codes have come into wide usage on the basis of permitting application to supermarket items, vehicles, inventory parts, etc., of an image representing a multi-digit identifying number which is readily machine-readable. A variety of devices and applications of technology using lasers or charge coupled devices, for example, have been made available and are in wide use for reading such bar codes. On the one hand, two-dimensional bar codes make possible a wide-variety of new uses and applications in which a much wider range of information and data may be encoded and distributed by mail, facsimile transmission, etc., alone or in combination with other graphic or textural images, as well as being affixed to products, vehicles and inventory items, for example. On the other hand, two-dimensional bar codes require more complex capabilities for accurately reading the greatly increased amount of encoded data. Actual location and orientation of the bar code image within the scanned image (assuming the scanning device, as a practical matter, actually scans a somewhat larger image area which includes at least one bar code image) may entail a substantial data processing capability.

The result of the foregoing is that extension of use of two-dimensional bar codes to all logical applications may be restricted on an economic basis in the absence of efficient and economical methods and arrangements capable of implementing the required scanning and decoding of the bar code images, including methods and arrangements for locating and determining the bounds and orientation of two-dimensional bar code images within scanned image areas in order to enable such decoding of the bar codes.

It is therefore an object of this invention to provide methods and systems capable of both locating and determining the bounds and orientation of two-dimensional bar code images within a scanned image area.

Additional objects are to provide new and improved methods and systems for locating bar code images and particularly such methods and systems for providing bounding coordinates of a bar code included in scanned image data.

SUMMARY OF THE INVENTION

In accordance with the invention, a method for locating and determining the bounds and orientation of a two-dimensional bar code image including identifiable start and stop patterns, comprises the steps of:

(a) providing a stored image representing a scanned image area which may include a two-dimensional bar code image;

(b) sampling the stored image along equally spaced parallel scan lines in a first direction across a potential bar code image location included in such image area, to provide scan line samplings;

(c) repeating such step (b) sampling in at least one additional direction having an angular separation from the first direction, to provide additional scan line samplings;

(d) analyzing scan line samplings provided in steps (b) and (c) to identify bar code start and stop pattern traversals where such samplings cross said patterns;

(e) correlating bar code start and stop patterns as representative of a common bar code image (i) when two start patterns, or two stop patterns, are identified in scan line samplings taken along parallel scan lines having not more than a predetermined lateral spacing, and (ii) when a start pattern and a stop pattern are identified in the same scan line sampling with such start and stop patterns having not more than a predetermined separation, to identify correlated start and stop pattern traversals representative of the bar code image;

(f) utilizing such correlated start and stop pattern traversals representative of the bar code image to identify a nominally rectangular area bounding the bar code image; and (g) making available data representative of the coordinates of the four corners of such nominally rectangular area.

Also in accordance with the invention, a system for locating a two-dimensional bar code image including identifiable start and stop patterns, includes storage means for storing image data representing a scanned image area which may include such a two-dimensional bar code image. Sampling means are provided for sampling the stored image along spaced parallel scan lines in a first direction across a potential bar code image location included in such image area to provide first scan line samplings, and for similarly sampling the stored image in at least one additional direction having an angular separation from the first direction to provide additional scan line samplings. The system also includes analysis means, coupled to the sampling means, for analyzing such first and additional scan line samplings to identify bar code start and stop patterns traversed by the samplings. Correlating means are arranged for correlating the identified bar code start and stop patterns as representative of a common bar code image (i) if two start patterns, or two stop patterns, are identified in scan line samplings taken along parallel scan lines having not more than a predetermined lateral spacing and (ii) if a start pattern and a stop pattern are identified in the same scan line sampling with those patterns having not more than a predetermined separation, in order to provide correlated start and stop pattern data representing the bar code image. The system also includes bounds identifying means for utilizing the correlated start and stop pattern data representing the bar code image to derive data identifying a nominally rectangular area bounding the bar code image and output port means for coupling data identifying such nominally rectangular area for use in decoding the bar code.

BRIEF DESCRIPTION OF THE DRAWINGS

FIG. 1 shows a form of two-dimensional bar code.

FIG. 2 is a block diagram of a system for locating two-dimensional bar codes in accordance with the invention.

FIGS. 3a and 3b are diagrams useful in describing operation of the FIG. 2 system.

DESCRIPTION OF THE INVENTION

Referring now to FIG. 2, there is shown a simplified block diagram of a bar code locating system 20 in accordance with the invention. As illustrated, locating system 20 is coupled to an access port 12 of an image buffer 10. As discussed above, a two-dimensional bar code image such as shown in FIG. 1 may appear as an image printed on a piece of paper or elsewhere. In order to recover the information stored in coded form in such a bar code, the image is first scanned. Image data, typically in the form of pixel data, resulting from scanning of the image is stored in known manner in a device such as image buffer 10 via an input port 14. Image buffer 10, which may comprise a known type of frame buffer, is arranged to provide a stored image which is available for scanning, sampling or other image processing purposes via the access port 12. It is generally not possible or practical to provide a scanned image comprising solely a desired bar code image which is aligned horizontally in the image area as scanned and stored. In practical applications, the image area scanned and stored will comprise a larger image, including a bar code image. Also, the bar code image will typically have a skewed alignment within the scanned image area and the bar code image may actually appear on end or upside down within the scanned image area. Thus, it will be appreciated that prior to initiating any decoding of the bar code image it is highly desirable or necessary (depending on the form and complexity of the decoding process to be employed) to locate and determine the bounds of the bar code image within the scanned image which has been stored. Such need for determining the location and bounds of a bar code image is especially critical in the case of two-dimensional bar codes employing complex coding to achieve increased data storage. These considerations will be further addressed in discussion of operation of the invention in connection with FIGS. 3a and 3b.

In the FIG. 2 embodiment, bar code locating system 20 is arranged for locating a two-dimensional bar code image including identifiable start and stop patterns, such as illustrated at A and B, respectively, in FIG. 1. As shown in FIG. 1, this form of two-dimensional bar code includes a plurality of side-by-side rows of coded information aligned in a first direction (i.e., horizontally in this example) and a start pattern A and a stop pattern B extending normally to the row direction (i.e., vertically in this example).

The FIG. 2 system includes sampling mean 22 for sampling, via access port 12, the image stored in image buffer 10. As will be described with reference to FIG. 3a, such sampling is desirably implemented along spaced parallel scan lines in a first direction across a potential bar code image location included in the stored image area, to provide first scan line samplings. The sampling is then carried out in at least one additional direction angularly separated from the first direction, and may preferably be implemented in a total of four directions having successive angular separations of 45 degrees, to provide additional scan line samplings.

In FIG. 2, analysis means 24 is provided for analyzing the first and additional scan line samplings provided by sampling means 22 in order to identify bar code start and stop patterns (as at A and B in FIG. 1) which were traversed by the stored image samplings. Thus, each traversal or crossing of a start pattern or a stop pattern by a scan line sampling is identified. The identification as implemented desirably distinguishes between a traversal of a start pattern and a traversal of a stop pattern.

System 20, as illustrated, further includes correlating means 26 for correlating start and stop patterns representative of a common bar code image. Two correlating factors are employed. First, if two start patterns (or two stop patterns) are identified in scan line samplings taken along parallel scan lines having not more than a predetermined lateral spacing, they are correlated as representing the same bar code (i.e., a common bar code). Second, if a start pattern and a stop pattern are identified in the same scan line sampling with such start and stop patterns having not more than a predetermined separation, they are correlated as representing a common bar code. In this manner, correlating means 26 is effective to provide correlated start and stop pattern data.

Bounds identifying means 28 is included in the FIG. 2 system for utilizing the correlated start and stop pattern data representing a bar code image to derive data identifying a nominally rectangular area bounding the bar code image. Once having the correlated data, available data analysis techniques are employed to define a rectangular area adequate to bound the image locations of all start and stop pattern traversals which have been correlated as belonging to or representing a common bar code image. As will be indicated with reference to FIG. 3b, it is not necessary for present purposes for the rectangular bounding box to be precisely coextensive with the outline of the bar code image in order to facilitate a subsequent decoding process. The data analysis is carried out utilizing dimensional tolerances appropriate for the particular types of bar code image to be bounded (as identified by the particular start and stop pattern codings) in a manner determined by persons skilled in relevant forms of data processing and analysis, in order to define a bounding box suitable to enclose the subject bar code image. Bounds identifying means 28 is thus effective to provide data in the form of the X and Y coordinates of the four corners of a nominally rectangular area, or bounding box, enclosing the bar code image, or data in other forms as may be desired. The word "nominally" is used because, depending upon the analysis process and tolerances applied, the coordinates of four points may define a four sided figure which is not actually rectangular, but which locates and bounds the bar code image adequately for the decoding process to be employed.

In some cases, a bar code image to be processed may be damaged (e.g., during reproduction, by partial destruction, etc.) so that part or all of a start or stop pattern or other image portion is missing. To provide enhanced bar code image bounding in such cases, the bounds identifying means may be arranged to always identify a bounding box which is both rectangular and has dimensions at least as large as a predetermined size of bar codes to be processed. The resulting coordinate data permits a subsequent decoding process to make best use of error correction or other image interpretation aids in attempting to decode the damaged bar code image.

The FIG. 2 system further includes an output port 30 for coupling bar code bounding data for further use. From port 30, such data may be used in a bar code decoding system, may be stored for future use, etc.

OPERATION OF THE LOCATING SYSTEM

Referring now to FIGS. 3a and 3b there are shown two representations of a scanned image area which are useful in describing operation of the bar code locating system 20 of FIG. 2. In FIG. 3a, 40 represents the outline border of a selected image area which has been scanned and stored. In this example, image area 40 includes both a one-dimensional bar code image 42 and a two-dimensional bar code image 44. The image area 40 (with the two bar code images) exists in a suitable storage format, such as image buffer 10 of FIG. 2, which may represent what is commonly termed a frame buffer.

Unit 20 may comprise data processing means and programming suitable for implementing the following method for identification of the bounds and orientation of a bar code. With reference to FIG. 3a, stored image data representing the image area 40 is sampled along or between parallel scan lines (shown dotted) which are shown equally spaced, such spacing being termed the "skipfactor". In other applications different spacing patterns may be used. The skipfactor for the horizontal scan lines in FIG. 3a is indicated at 46. Such sampling may desirably be carried out in four directions indicated at 48, which are equally spaced from each other at successive 45° angular separations. The resulting parallel samplings are then analyzed to identify bar code start and stop patterns by their distinctive predetermined coding as illustrated in FIG. 1. Identifications of start and stop patterns are then correlated or grouped, as being representative of a common bar code image, as follows:

(a) two start patterns (or two stop patterns) are grouped together if identified in parallel samplings separated by not more than a predetermined distance (e.g., twice the relevant skipfactor); and (b) a start pattern and a stop pattern are grouped together if they are both identified in the same parallel sampling with a separation between the patterns of not more than a predetermined separation (e.g., a maximum bar code image dimension).

Data as to such correlation is then analyzed to identify a nominally rectangular area bounding a bar code image included in image area 40. Thus, in FIG. 3b, bounding boxes for bar code images 42 and 44 are indicated at 50.

The bounding boxes may suitably be identified by the coordinates of their respective corners, which will be effective to indicate both the bounds and the orientations of the respective bar code images 42 and 44. As a variation, bounding boxes such as at 50 may be determined based upon analysis of the positioning of all of the start and stop pattern positions correlated or grouped as above as belonging to a single bar code, in order to determine the smallest rectangular outline or bounding box capable of encompassing all of the correlated start and stop pattern traversals for that particular bar code. Again, such bounding box may be identified by its corner coordinates. The resulting data representative of the bounds and orientation of a bar code is then made available as an output at port 30 for storage or direct use in a decoder for bar code decoding.

System 20 may comprise data processing equipment and associated programming to carry out the functions of sampling means 22, analysis means 24, correlating means 26 and coordinate identifying means 28 using known forms of data processing and each such means need not necessarily be implemented in individually discrete form within unit 20. The identification of the bounds and orientation of the bar code image is provided at output port 30 of the locating system for use in enabling the further processing of the selected image data in order to decode the bar code image. In addition to identifying the bounds and orientation of a bar code image included in a scanned image area, locating system 20 may be employed to provide an indication of whether the presence of any predetermined type of bar code has been identified within the scanned image area.

While there has been described the currently preferred embodiment of the invention, those skilled in the art will recognize that other and further modifications may be made without departing from the invention and it is intended to claim all modifications and variations as fall within the scope of the invention.

What is claimed is:

1. A method for locating and determining the bounds of a two-dimensional bar code image including identifiable start and stop patterns, comprising the steps of:
 (a) providing a stored image representing a scanned image area which may include said two-dimensional bar code image;
 (b) sampling said stored image along spaced parallel scan lines in a first direction across a potential bar code image location included in said image area, to provide scan line samplings;
 (c) repeating said step (b) sampling in at least one additional direction having an angular separation from said first direction, to provide additional scan line samplings;
 (d) analyzing scan line samplings provided in steps (b) and (c) to identify bar code start and stop pattern traversals where said samplings cross said patterns;
 (e) correlating said bar code start and stop patterns as representative of a common bar code image (i) when two start patterns, or two stop patterns, are identified in scan line samplings taken along parallel scan lines having not more than a predetermined lateral spacing, and (ii) when a start pattern and a stop pattern are identified in the same scan line sampling with said start and stop patterns having not more than a predetermined separation, to identify correlated start and stop pattern traversals representative of said bar code image;

(f) utilizing said correlated start and stop pattern traversals representative of said bar code image to identify a nominally rectangular area bounding said bar code image; and (g) making available data representative of the location of said nominally rectangular area within said scanned image area.

2. A method as in claim 1, wherein said step (a) comprises providing said stored image as a two-dimensional array of pixel data capable of being sampled in a plurality of directions having angular separations.

3. A method as in claim 1, wherein step (c) comprises repeating said step (b) three times at successive 45 degree angular separations from said first direction.

4. A method as in claim 1, wherein step (e) comprises correlating start and stop patterns pursuant to clause (i) with said predetermined lateral spacing in clause (i) equal to twice the separation between adjacent scan lines and pursuant to clause (ii) with said predetermined separation in clause (ii) equal to a maximum bar code dimension.

5. A method as in claim 1, wherein step (f) comprises identifying said nominally rectangular area by the coordinates of its four corners and wherein data defining said coordinates is made available in step (g).

6. A method as in claim 1, wherein step (f) comprises identifying said nominally rectangular area as the smallest such area encompassing the positions of all said start and stop pattern traversals correlated as representing a common bar code image.

7. A method as in claim 1, wherein step (f) comprises identifying nominally rectangular areas bounding one-dimensional bar code images as well as such areas bounding two-dimensional bar code images.

8. A system for locating a two-dimensional bar code image, including identifiable start and stop patterns, within a stored image representing a scanned image area which may include said two-dimensional bar code image, comprising:

sampling means for sampling said stored image along spaced parallel scan lines in a first direction across a potential bar code image location included in said image area to provide first scan line samplings, and for similarly sampling said stored image in at least one additional direction having an angular separation from said first direction to provide additional scan line samplings;

analysis means, coupled to said sampling means, for analyzing said first and additional scan line samplings to identify bar code start and stop patterns traversed by said samplings;

correlating means, coupled to said analysis means, for correlating said bar code start and stop patterns as representative of a common bar code image (i) if two start patterns, or two stop patterns, are identified in scan line samplings taken along parallel scan lines having not more than a predetermined lateral spacing and (ii) if a start pattern and a stop pattern are identified in the same scan line sampling with said patterns having not more than a predetermined separation, to provide correlated start and stop pattern data representing said bar code image;

bounds identifying means, coupled to said correlating means, for utilizing said correlated start and stop pattern data representing said bar code image to derive data identifying a nominally rectangular area bounding said bar code image; and output port means, coupled to said bounds identifying means, for coupling said data identifying said nominally rectangular area for further use.

9. A system as in claim 8, wherein said sampling means is arranged for sampling said stored image in four directions having successive angular separations of 45 degrees.

10. A system as in claim 8, wherein said bounds identifying means is arranged for deriving data identifying said nominally rectangular area by the coordinates of four corners of said rectangular area.

11. A system as in claim 8, wherein said bounds identifying means is arranged for deriving data identifying the smallest area encompassing the positions of all said start and stop pattern traversals correlated as representing a common bar code image.

* * * * *